June 21, 1960

H. D. ANSPON ET AL 2,941,917

LAMINATED POLYMER SHEETS

Filed March 26, 1954

INVENTORS
HARRY D. ANSPON
FRANK E. PSCHORR
BY

ATTORNEY

United States Patent Office 2,941,917
Patented June 21, 1960

2,941,917

LAMINATED POLYMER SHEETS

Harry D. Anspon, Easton, and Frank E. Pschorr, Phoenixville, Pa., assignors to General Aniline & Film Corporation, New York, N.Y., a corporation of Delaware No Drawing. Filed Mar. 26, 1954, Ser. No. 419,115

8 Claims. (Cl. 154—139)

This invention relates to laminated polymer sheets of polymethyl α-chloroacrylate and a polymer of an ester of acrylic or methacrylic acid, and to a method for making such sheets.

Polymethyl α-chloroacrylate in sheet form is characterized not only by excellent clarity, but also by outstanding flame resistance, hardness, and resistance to abrasion. These properties render it highly desirable as visor material in airplane construction. It is superior in these respects to polymers of acrylic and methacrylic esters. On the other hand, it is relatively expensive and has a substantially higher density than the aforesaid ester polymers containing no chlorine.

A laminated material having at least one external surface layer of polymethyl α-chloroacrylate and the interior or other layers of an acrylic or methacrylic ester polymer combines the relative lightness and lower cost of the latter polymers with the hardness, abrasion and flame resistance of polymethyl α-chloroacrylate. Preparation of laminated sheets by securing together preformed sheets of the respective materials by means of adhesives is impractical, since such sheets are subject to separation during forming operations and from weathering, and heterogeneous adhesive interlayers ordinarily reduce the clarity of the laminate.

We have discovered that permanently laminated sheets having an exterior layer of polymethyl α-chloroacrylate and a layer of acrylic or methacrylic ester polymer permanently adhering thereto can be prepared by mass polymerization of a layer of acrylic or methacrylic ester monomer in contact with a preformed sheet of polymethyl α-chloroacrylate, preferably as an intermediate layer between a pair of such sheets. The resulting structure is characterized by excellent clarity, and the layers are substantially inseparable by mechanical force.

The mechanical resistance of the bond formed between the different layers in the sheets of this invention is especially surprising in view of the fact that the acrylic and methacrylic ester monomers have no solvent or swelling effect on preformed polymethyl α-chloroacrylate.

Figure 1:
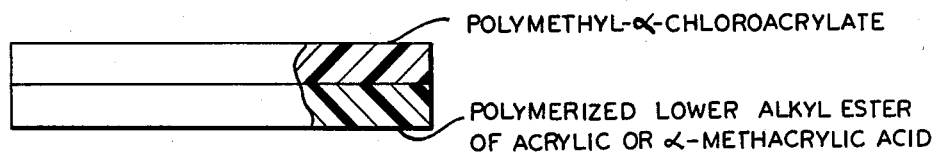
Figure 2:
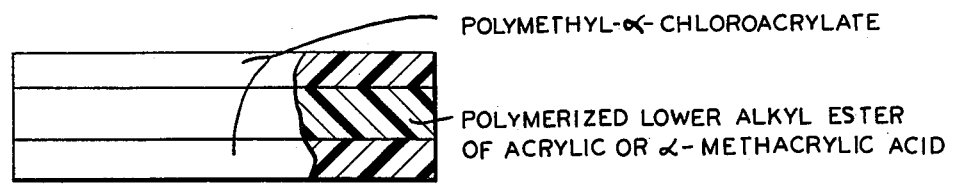

Laminated sheets according to this invention are illustrated in the accompanying drawing, wherein Figure 1 is a side elevation, partly sectioned, of a polymer sheet having one layer of polymethyl alpha-chloroacrylate and one layer, integral therewith, of a polymerized acrylic or alpha-methacrylic lower alkyl ester polymer; and Figure 2 is a side elevation, partly sectioned, of a polymer sheet having two external layers of polymethyl alpha-chloroacrylate and an intermediate layer, integral with the external layers, of polymerized acrylic or alpha-methacrylic lower alkyl ester.

Manufacture of the laminated sheets of this invention can be carried out by constructing a mold as commonly employed for casting acrylic polymer sheets, in which at least one of the mold plates is a sheet of polymethyl α-chloroacrylate. The adjacent mold space is filled with acrylic or methacrylic ester monomer and the latter is polymerized by known methods.

The preferred sheets of this invention can be made by constructing a mold of a pair of sheets of polymethyl α-chloroacrylate, spaced apart in face-to-face relation, with their edges enclosed by a sealing strip spanning their edge portions to define a mold space, filling the resulting mold with the acrylic or methacrylic ester monomer and polymerizing, for example, by irradiation with ultraviolet light, use of a catalyst (e.g. a peroxide) and/or application of heat.

Alternatively, a separable mold plate such as glass can be employed for one side of the mold and can be later removed to obtain a laminated sheet having only one exterior layer of polymethyl α-chloroacrylate, and the other layer of acrylic or methacrylic ester polymer.

Our invention is illustrated by the following example, wherein percentages are by weight.

*Example*

Two sheets of methyl α-chloroacrylate, about one foot square and ⅛-inch in thickness, are positioned in face-to-face relation, separated by ¼-inch brass spacers, and joined along their edges by a sealing strip of filter paper impregnated with a solution of zein. A small filler opening is allowed to remain at one point in the sealing strip for introduction of a polymerizable monomer into the mold space between the sheets. After drying the sealing strip, the spacers are removed through the filler opening, the stiffness of the sealing strip maintaining the desired spacing of the sheets. The intervening mold space is then filled with methyl α-methacrylate, previously purified by distillation, and containing 0.05% of benzoyl peroxide as a polymerization catalyst. The filler opening is then sealed with regenerated cellulose film coated with hot aqueous gelatin solution. The monomer is polymerized by heating the mold contents for 72 hours at 57° C., and for an additional 24 hours at 80° C. After cooling, the sealing strip is removed and a laminated sheet is obtained having exterior layers of polymethyl α-chloroacrylate and an interior layer of polymethyl methacrylate.

Small blocks of the resulting laminated sheet completely resisted mechanical attempts to pry them apart at the junction of the two polymers, despite the fact that no softening or solubilizing effect was found to be exerted by methyl methacrylate monomer on polymethyl α-chloroacrylate when immersed therein. The laminated sheet exhibited excellent shock resistance in that a hammer blow which crushed the polymethyl α-chloroacrylate on one side left the interlayer of polymethyl methacrylate and the opposite layer of polymethyl α-chloroacrylate unaffected. On holding the sheet in a flame until it caught fire, it was observed that the burning was quite slow after removal from the flame, and was self-extinguishing as a result of expansion of the polymethyl α-chloroacrylate over the polymethyl methacrylate layer.

Instead of methyl methacrylate monomer, ethyl acrylate or other lower alkyl esters of acrylic or methacrylic acid can be used in the foregoing example. Such esters include methyl, ethyl, propyl, butyl, and isobutyl acrylate or methacrylate.

By substituting higher alkyl esters such as octyl, lauryl or hexyl esters of acrylic or methacrylic acid for the methyl methacrylate in the example, laminated sheets are obtained in which the interlayer is capable of cold flow and the sheets are self-sealing after puncture as by a bullet.

Other variations which will be obvious to those skilled in the art can be made in this invention without departing from the scope or spirit thereof.

We claim:
1. A process for making a laminated polymer sheet, which comprises polymerizing a layer of a liquid ester of the class consisting of alkyl esters of acrylic and of α-methacrylic acids in contact with a preformed sheet of polymethyl α-chloroacrylate.

2. A process for making a laminated polymer sheet, which comprises polymerizing a layer of a liquid ester of the class consisting of alkyl esters of acrylic and α-methacrylic acids enclosed and in contact with a pair of sheets of polymethyl α-chloroacrylate.

3. A process as defined in claim 1, wherein the liquid ester is a lower alkyl ester of α-methacrylic acid.

4. A process as defined in claim 1, wherein the liquid ester is methyl α-methacrylate.

5. A process as defined in claim 1, wherein the liquid ester is ethyl acrylate.

6. A process as defined in claim 2, wherein the liquid ester is a higher alkyl ester of α-methacrylic acid.

7. A laminated sheet having an external layer of polymethyl α-chloroacrylate and an adjacent layer adhering directly thereto of a polymer, polymerized in situ, of the class consisting of a polymerized alkyl esters of acrylic and α-methacrylic acids.

8. A laminated sheet having external layers of polymethyl α-chloroacrylate and an intervening layer adhering directly to both external layers of a polymer, polymerized in situ, of the class consisting of polymerized alkyl esters of acrylic and α-methacrylic acids.

References Cited in the file of this patent

UNITED STATES PATENTS

| | | |
|---|---|---|
| 2,095,944 | Bauer et al. | Oct. 12, 1937 |
| 2,445,536 | Parsons et al. | July 20, 1948 |
| 2,464,826 | Neher et al. | Mar. 22, 1949 |

OTHER REFERENCES

Journal of Amer. Chem. Society, October 1942, pages 2389–2393.